United States Patent [19]

Junemann et al.

[11] 4,210,356
[45] Jul. 1, 1980

[54] CLAMP FOR FASTENING TRIM ABOUT A WINDSHIELD

[75] Inventors: Dietrich Junemann, Loerrach; Hans Henning, Weil-Haltingen, both of Fed. Rep. of Germany

[73] Assignee: A Raymond, Loerrach, Fed. Rep. of Germany

[21] Appl. No.: 880,167

[22] Filed: Feb. 22, 1978

[30] Foreign Application Priority Data

Mar. 3, 1977 [DE] Fed. Rep. of Germany ....... 2710592

[51] Int. Cl.² .............................. B60J 1/00; B60J 9/00
[52] U.S. Cl. ....................................... 296/84 A; 52/208
[58] Field of Search ............................ 49/475; 52/208; 296/84 R, 84 A

[56] References Cited

U.S. PATENT DOCUMENTS

| | | | |
|---|---|---|---|
| 2,556,775 | 6/1951 | Oswald | 296/84 R |
| 2,793,071 | 5/1957 | Meyer | 296/84 R |
| 3,228,156 | 1/1966 | Hitzelberger | 296/84 R |
| 3,245,182 | 4/1966 | Zierold | 296/84 R |
| 3,274,740 | 9/1966 | Hall | 296/84 R |
| 3,400,971 | 9/1968 | Rentz | 296/84 R |
| 3,597,798 | 5/1971 | Henderson | 296/84 R |
| 3,783,568 | 1/1974 | Adler et al. | 296/84 R |

*Primary Examiner*—Richard A. Bertsch
*Attorney, Agent, or Firm*—Finnegan, Henderson, Farabow, Garrett & Dunner

[57] ABSTRACT

Disclosed is a clamp for fastening an elongated strip of trim about the margin of a windshield and a seating frame carrying the windshield. A clamp component is either directly secured to the seating frame or to the margin of the windshield which, in turn, is secured to the seating frame. The clamp component has outwardly projecting guides receivable within guide slots of an overlying holding component. The holding component includes a pair of elastic strips for holding the strip of trim. The holding component is movable transversely on the clamping component in a direction transverse to the margin of the windshield to compensate for dimensional deviations of the sealing frame and windshield.

12 Claims, 5 Drawing Figures

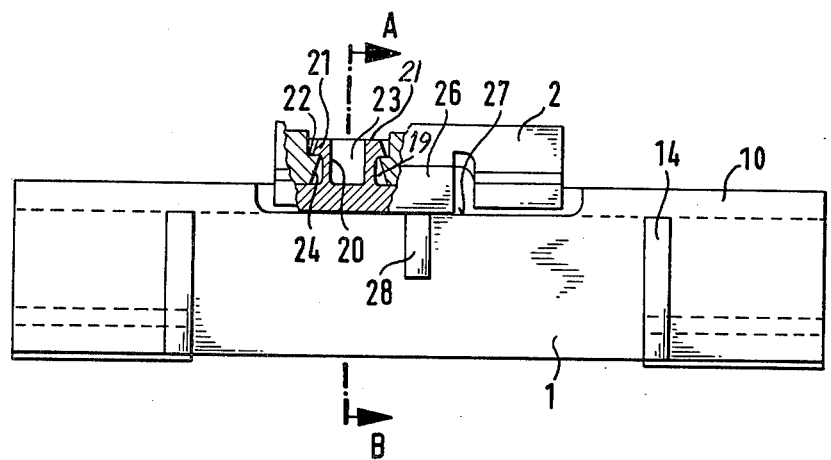
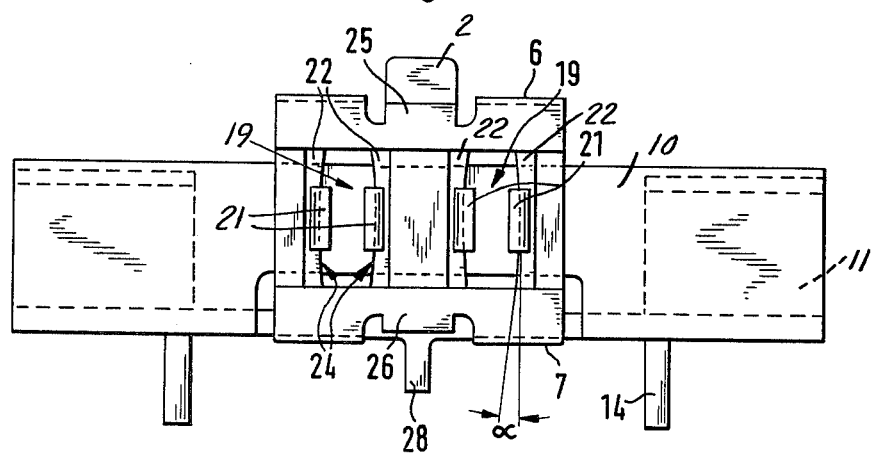

CLAMP FOR FASTENING TRIM ABOUT A WINDSHIELD

The present invention relates generally to a clamp for fastening trim about the windshield of a motor vehicle and particularly relates to a clamp for fastening trim about the margins of a windshield and seating frame mounting the windshield which compensates for dimensional deviations of the seating frame and windshield.

When mounting the frame for trim about the seating frame of a windshield in a motor vehicle, it is important for reasons of aesthetics as well as for sealing that the entire length of trim bear against the outer surface of the vehicle body. The frame for the trim is generally pressed against a clamp which consists of a clamping component positioned adjacent -elastic holding strips to which the trim is secured. The clamp is fastened either directly to the seating frame or to the rim of the windshield. It will be appreciated that the trim is composed of several trim segments.

Because of unavoidable dimensional deviations in the seating frame, it frequently occurs that the trim frame which has been previously assembled using a template or a drawing, will not exactly meet the holding components of the clamp. As a consequence, the frame for the trim must be precisely adjusted to the seating frame, for example, to the position of the clamps. To that end, the trim segments of the frame are joined together by sleeve-like junctions and the ends of the trim segments within the sleeve are displaced according to the mismatch. However, this type of fitting is very costly in time and labor and interferes with production along the assembly line.

The present invention provides a fastening clamp which enables rapid and simple assembly of the pre-finished trim frame on prepositioned holding clamps without requiring fitting in regard to dimensional deviations caused by the conventional finishing tolerances relating to the seating frame, windshield and the frame for the trim.

In accordance with the present invention, there is provided a clamp including a clamping component which guides a holding component for movement transverse to the longitudinal direction of the holding strips of the clamping component. Thus, the movable holding component of the clamp automatically adjusts to the proper position, corresponding to any deviations within required tolerances, when the trim frame is applied to the clamp. The present invention is also applicable to different types of clamps, for example, a clamp component which is fixed by a T-bolt directly to the windshield frame or by a U-shaped clamp component to the rim of the windshield. The latter clamp is preferred if the windshield is bonded to the seating frame. In such case, the leg of the clamp component extending behind the windshield extends into the bonding region and is thus fixed with respect to the margin of the windshield.

Because the measurements of the seating frame may vary within a range of permissible tolerances and because the dimensions of the windshield may also vary, a further characteristic of the invention provides for spacers on the back of the clamping component. These spacers rest against the seating frame. Also, the legs of the clamping component are dimensioned so that, even with the maximum deviations allowed under the tolerances between the seating frame and the windshield, the margin of the windshield will always be gripped by and between the legs of the clamping component. In this manner a uniform overlap of the trim is ensured for the outer rim of the windshield frame.

Accordingly, it is a primary object of the present invention to provide a novel and improved clamp for fastening trim about the margin of a windshield.

It is another object of the present invention to provide a novel and improved clamp for fastening trim about the margin of a windshield wherein the clamp compensates for dimensional deviations between the sealing frame and the margin of the windshield.

It is still another object of the present invention to provide a novel and improved clamp for fastening trim about the margin of a windshield wherein the trim is readily and easily applied to the clamp.

It is a further object of the present invention to provide a novel and improved clamp for fastening trim about the margin of a windshield wherein the clamp has components movable relative to one another in a direction transverse to the lengths of the seating frame and margin of the windshield to compensate for dimensional deviations of the sealing frame and windshield margin.

Additional objects and advantages of the present invention will be set forth in part in the description which follows and in part will be obvious from the description, or may be learned by practise of the invention. The objects and advantages of the invention may be realized and attained by means of the instrumentalities and combinations particularly pointed out in the appended claims.

To achieve the foregoing objects and in accordance with the purposes of the present invention as embodied and broadly described herein, the clamp for fastening an elongated strip of trim about the margin of a windshield mounted in a seating frame comprises a clamping component for securement about the seating frame, a holding component including a pair of elastic holding strips extending lengthwise in a direction generally parallel to the margin of the windshield for holding the strip of trim, and means carried by the clamping component and engageable with the holding component to secure the holding component to the clamping component for slidable movement of the clamping component relative to the holding component in a direction generally transverse to the longitudinal extent of the holding strips to compensate for dimensional deviations of the seating frame and windshield.

In a preferred form, the holding component has parallel guide slots and the clamping component has guides receivable within the guide slots together with means for retaining the guides in the guide slots. The guides preferably are provided in pairs of two for reception in each slot and spaced one from the other a distance equal to the lateral extent of projections carried by the guide whereby the guides can be deformed inwardly toward one another upon insertion into the guide slots and snapped back to retain the holding component to the clamping component. The walls defining the slots as well as the outer walls of the projections are tapered in similar directions to facilitate insertion of the guides into the guide slots. Also, preferably the side walls of the guide slots are convergent toward one another at their opposite ends to prevent jamming of the guides within the slots.

The invention consists in the novel parts, constructions, arrangements, combinations and improvements shown and described herein together with the accompanying drawings of which:

IN THE DRAWINGS

FIG. 2 is a side view of the clamp illustrated in FIG. 1 with a fragmentary cross-sectional view taken generally about on line C-D in FIG. 1 through the guide slots;

FIG. 3 is a plan view of the clamp;

Figure 4:
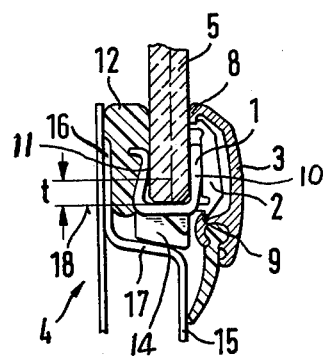
FIG. 4 is a view similar to FIG. 1 illustrating the installation with the assembled trim and the clamp fastened to the windshield rim.

As illustrated in FIG. 4, the clamp of the present invention includes a clamping component 1 anchored in the region of or adjacent to a seating frame 4 and a holding component 2 which seats trim 3. Trim 3 serves to cover or close the gap between a seating frame 4 and a windshield 5. Holding component 2 is provided with two elongated elastic holding strips 6 and 7 which are elastically compressed or deformed toward one another upon application of trim 3 to holding component 2. When the inwardly shaped or bent rims 8 and 9 of trim 3 snap past strips 6 and 7 into position behind strips 6 and 7 and the latter return toward their original unstressed state to grip rims 8 and 9, trim 3 is held in sealing relation against windshield 5 and outer wall 15 of seating frame 4.

Figure 1:
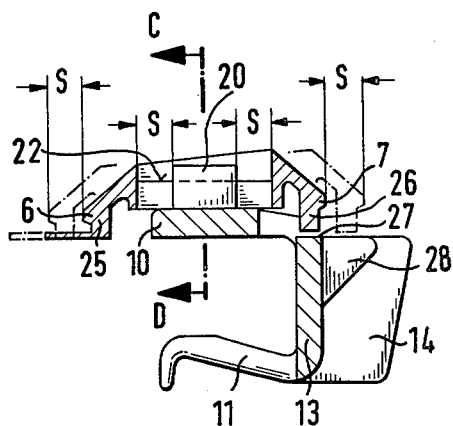
FIG. 1 is a cross-sectional view of an assembled clamp constructed in accordance with the present invention and taken generally about on line A-B of FIG. 2.
Figure 5:
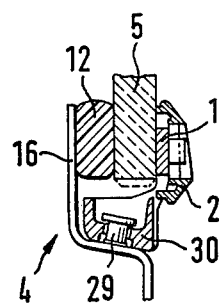
FIG. 5 is a view similar to FIG. 4 illustrating another embodiment in which the clamp is fixed in the seating frame.

The clamp, in the region of or adjacent to margin 18 of windshield 5, may be anchored to the windshield margin by means of clamp legs 10 and 11 illustrated in FIGS. 1 and 4. Alternately, the clamp may be secured directly to seating frame 4 for instance by using a T-bolt connection illustrated at 29 and 30 (FIG. 5). The former manner of securement is particularly advantageous when windshield 5 is held at the inside wall 16 of seating frame 4 by a bonding bead 12. In this case, clamp leg 11 located on the inside of windshield 5 is disposed as high as and is engaged by the bonding head 12 and thereby fixed with respect to windshield 5.

In view of the occasional deviation within tolerances between windshield 5 and seating frame 4, clamping component 1 is provided along its web or back between legs 10 and 11 with spacers 14 which rest against the side wall 17 of seating frame 4. Spacers 14 thus fix the clamp in position at the same spacing from frame side wall 17. Clamp legs 10 and 11 are so dimensioned in length that they will always grasp and enclose the margin 18 of windshield 5.

In order to compensate where needed for deviations within tolerances between the dimensions of seating frame 4 and trim 3, means are provided for securing holding component 2 to and for slidable movable along clamping component 1 in a direction transverse to the longitudinal extent of holding strips 6, 7 as illustrated by the dashed lines shown in FIG. 1. As illustrated in FIGS. 2 & 3 two parallel guide slots 19 are provided in holding component 2 and receive corresponding guides or projections 20 carried by the free leg 10. Guides 20 are received within guide slots 19 and have means such as locking hooks or projections 21 for engaging the holding component.

More particularly, guides 20 are formed of elastic material so that, upon insertion into guide slots 19, they first deform laterally upon such insertion and then snap back under their natural resiliency into positions to locate hooks or projections 21 behind the corresponding support surfaces or shoulders 22 in guide slots 19. Support surfaces 22 are recessed in slots 19 on the side of the holding component remote from the clamping component (see FIG. 2) so that hooks 21 and guides 20 need not project from slots 19 outwardly of holding component 2. This feature is particularly applicable for holding components formed of plastic material, such as by injection molding, since said support surfaces 22 may be readily recessed when molded.

A single guide 20 for each guide slot 19 is sufficient to ensure problem-free displaceable mounting of holding component 2 to clamping component 1. However, in order to better distribute the holding or clamp retention forces and in order to minimize the dimensions of guides 20 as well as their hooks 21 so as to minimize the extent of outward projection of or elevation of the clamp, preferably two mutually opposite and spaced guides 20 each with a laterally projecting hook 21 are provided for insertion into each guide slot 19 in the clamp of the invention. The space 23 between each pair of guides 20 is at least as wide as the width of both hooks 21 when these are compressed into slot 19. It is also possible to offset guides 21 one from the other so that they pass each other upon their elastic deformation when the holding component is applied. In such case, each slot 19 is narrowed, and formed correspondingly longer.

The side walls 24 of guide slots 19 are preferably chamfered at 24 (FIG. 2) in such manner that they flare or taper in a direction away from free leg 10 of clamping component 1. Hooks 21 of guides 20 are similarly beveled and in the like direction, so that the pairs of guides, when pressed into guide slots 19, deform in a direction toward one another under the influence of these slanted surfaces until the guides snap back to engage their hooks 21 against the recessed shoulders 22.

Enough play "S" (FIG. 1) must be provided for guides 20 in guide slots 19 to compensate for the largest deviation permitted by the tolerances between the seating frame 4 and the trim frame 3. In order to maintain the guides 20 in slots 19 in a central position so they may yield equally in both directions, the side walls 24 of slots 19 converge toward one another at their opposite ends and at an angle preferably from 5° to 10°. The convergence of side walls 24 at opposite ends of the guide slots is to prevent jamming and enable the holding component 2 to slip toward the center.

Holding strips 6 and 7 are interrupted in the central region, i.e. substantially medially, of holding component 2 and replaced by feet 25 and 26. Front foot 25 rests against windshield 5 and rear foot 26 rests on the end face 27 of the back 13 of the clamp. To prevent foot 26 from projecting freely in the air without support upon a lateral displacement of holding component 2, a support 28 is mounted on back 13 at the level of face 27. This provides support to foot 26 when holding component 2 is displaced, for example, into the position illustrated by the dashed lines at the far right in FIG. 1.

The invention may be embodied in other specific forms without departing from the spirit or essential characteristics thereof. The present embodiment is therefore to be considered in all respects as illustratice and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A clamp for fastening an elongated strip of trim about the margin of a windshield mounted in a seating frame comprising;
    a clamping component for securing the clamp in place about the windshield,
    a holding component including a pair of elastic holding strips extending lengthwise in a direction generally parallel to the margin of the windshield for holding the strip of trim, and
    means carried by said clamping component and engageable with said holding component to secure said holding component to said clamping component for slidable movement of said holding component relative to said clamping component in a direction generally transverse to the longitudinal extent of said holding strips to compensate for dimensional deviations between the seating frame and the windshield.

2. A clamp according to claim 1 wherein said clamping component has a pair of generally U-shaped clamp legs connected by a web for engaging opposite sides of the windshield about its margin, spacers carried by said web for engagement with said seating frame, said legs being dimensioned so that the margin of the windshield remains engaged by said legs for maximum dimensional deviation between the seating frame and the windshield.

3. A clamp according to claim 1 wherein the means for securing said holding component with slidable movement comprises at least two mutually parallel guide slots in said holding component, said clamping component having guides receivable within each of said guide slots, and means for retaining said guides in said guide slots.

4. A clamp according to claim 3 wherein each of said guides is constructed of an elastic material and has a projection, said guides being elastically deformed upon insertion into said guide slots to enable said projections to snap into position in engagement against the sidewalls of the slots of said holding component upon full insertion of said guides into said guide slots.

5. A clamp for fastening an elongated strip of trim about the margin of a windshield mounted in a seating frame comprising:
    a clamping component for securing the clamp about the windshield,
    a holding component having a pair of elastic holding strips extending lengthwise in a direction generally parallel to the margin of the windshield for holding the strip of trim and two mutually parallel guide slots extending in a direction generally transverse to the length of the strips,
    said clamping component having guides mounted thereon and receivable within said guide slots, each of said guides being constructed of an elastic material and having a projection, said guides being elastically deformed upon insertion into said guide slots to enable said projections to snap into position in engagement against the sidewalls of the slots of said holding component upon full insertion of said guides into said guide slots whereby said holding component is secured to said clamping component for slidable movement therewith in a direction generally transverse to the longitudinal extent of said holding strips to compensate for dimensional deviations between the seating frame and the windshield.

6. The clamp according to claim 5 wherein said holding component has a shoulder adjacent each of the guide slots recessed from the face of said holding component remote from said clamping component, said projections engaging said shoulders upon full insertion of said guides into said guide slots.

7. A clamp according to claim 5 wherein two spaced guides are carried by said clamping component for insertion into each guide slot of said holding component, each of said guides carrying a lateral projection, the space between said two guides being at least as wide as the total lateral extent of the projections from the guides to enable elastic deformation of the guides toward one another upon insertion of the guides into the guide slots and engagement of the guides against the opposite side walls of the guide slots.

8. A clamp according to claim 7 wherein the sidewalls of said guide slots converge toward one another at their opposite ends to encourage the holding component to move toward a median position with respect to the clamping component.

9. A clamp according to claim 8 wherein the side walls of said guide slots extend generally parallel to one another adjacent the median of said slots for a distance substantially equal to the width of the guides receivable in said slots.

10. A clamp according to claim 5 wherein said holding component has a pair of shoulders along the opposite sidewalls of each of the guide slots recessed from the face of said holding component remote from said clamping component, two spaced guides carried by said clamping component for insertion into each guide slot, each of said guides carrying a lateral projection, the space between said two guides being at least as wide as the total lateral extent of the projections from the guides to enable elastic deformation of the guides toward one another upon insertion of the guides into the guide slots and engagement of the guides against the side walls of the guide slots, said projections engaging said recessed shoulders upon full insertion of said guides into each guide slot.

11. A clamp according to claim 5 wherein the side walls of said guide slots are tapered to converge toward one another in the direction of insertion of said guides into said guide slots, the projections having tapered wall portions tapered in a similar direction as the taper of said side walls to enable elastic deformation of said guides upon insertion of the guides into said guide slots and engagement of the tapered wall portions of said guides against the tapered walls of said guide slots.

12. A clamp according to claim 5 wherein said holding component has a pair of shoulders along the opposite sidewalls of each of the guide slots recessed from the face of said holding component remote from said clamping component, two spaced guides carried by said clamping component for insertion into each guide slot, each of said guides carrying a lateral projection, the space between said two guides being at least as wide as the total lateral extent of the projections from the guides to enable elastic deformation of the guides toward one another upon insertion of the guides into the guide slots and engagement of the guides against the side walls of the guide slots, said projections engaging said recessed shoulders upon full insertion of said guides into each guide slot, the side walls of said guide slots being tapered to converge toward one another in the direction of insertion of said guides into said guide slots, the projections having tapered wall portions tapered in a similar direction as the taper of said side walls to enable elastic deformation of said guides upon insertion of the guides into said guide slots and engagement of the tapered wall portions of said guides and the tapered walls of said guide slots.

* * * * *